(12) United States Patent
Lu et al.

(10) Patent No.: US 12,671,678 B2
(45) Date of Patent: Jun. 30, 2026

(54) HYBRID ENCODING FOR LOCAL DIFFERENTIAL PRIVACY

(71) Applicants: Lemon Inc., Grand Caymon (KY); Beijing Zitiao Network Technology Co., Ltd., Beijing (CN)

(72) Inventors: Donghang Lu, Culver City, CA (US); Bo Jiang, Culver City, CA (US); Wanrong Zhang, Culver City, CA (US); Jian Du, Culver City, CA (US); Qiang Yan, Shanghai (CN)

(73) Assignees: Beijing Zitiao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/759,171

(22) Filed: Jun. 28, 2024

(65) Prior Publication Data

US 2026/0006007 A1     Jan. 1, 2026

(51) Int. Cl.
 *H04L 9/40* (2022.01)
(52) U.S. Cl.
 CPC .................................. *H04L 63/0428* (2013.01)
(58) Field of Classification Search
 CPC .................................................... H04L 63/0428
 See application file for complete search history.

(56) References Cited

U.S. PATENT DOCUMENTS

| | | | | |
|---|---|---|---|---|
| 11,062,047 | B2 * | 7/2021 | Mukherjee .......... | G06F 21/6263 |
| 2022/0173898 | A1 * | 6/2022 | Wang ...................... | H04L 9/085 |
| 2022/0269816 | A1 * | 8/2022 | Qian ...................... | G06N 20/00 |

FOREIGN PATENT DOCUMENTS

| | | |
|---|---|---|
| CN | 115238756 A | 10/2022 |
| CN | 117709444 B | 5/2024 |

OTHER PUBLICATIONS

Differential Privacy Team, "Learning with Privacy at Scale," Apple Machine Learning Journal, Dec. 6, 2017, 25 pages.
Erlingsson et al., "RAPPOR: Randomized Aggregatable Privacy-Preserving Ordinal Response," CoRR, Submitted on Aug. 25, 2014, arXiv:1407.6981v2, 14 pages.
Extended European Search Report in European Appln. No. 25185040.0, mailed on Dec. 8, 2025, 8 pages.
Wang et al., "Locally Differentially Private Protocols for Frequency Estimation," Paper, Presented at Proceedings of the 26th USENIX Security Symposium, Vancouver, BC, Canada, Aug. 16-18, 2017; USENIX, Aug. 2017, pp. 729-745, 19 pages.

* cited by examiner

*Primary Examiner* — Thaddeus J Plecha
(74) *Attorney, Agent, or Firm* — Fish & Richardson P.C.

(57) ABSTRACT

Methods, systems, and apparatus, including computer programs encoded on computer storage media, for encoding data on client devices. One of the methods includes obtaining dataset for transmission; dividing the dataset into two subsets according to one or more selection criteria, wherein data items that satisfy the one or more criteria are added to a first subset and the data items that do not satisfy the one or more criteria are added to a second subset, wherein the first subset is smaller than the second subset; encoding the data items of the first subset according to a first encoding technique and encoding the data items of the second subset according to a second encoding technique; applying a local differential privacy (LDP) mechanism to data elements of the first subset and the second subset to generate an LDP message; and transmitting the LDP message to an external recipient.

17 Claims, 4 Drawing Sheets

HYBRID ENCODING FOR LOCAL DIFFERENTIAL PRIVACY

BACKGROUND

Various systems can communicate over a network. For instance, a client device can send data to a server device, e.g., a cloud computing server. The data communicated over the network can be encrypted to increase data privacy, data security, or both.

SUMMARY

Some client devices can transmit data to a recipient processing system, e.g., a server or a cloud system, for analysis. Sending plain text data can have privacy concerns, security concerns, or both. For instance, a malicious actor can access the data before it is received by the recipient processing system. In some examples, the recipient processing system shouldn't be allowed access to data that is not anonymized, e.g., given user permissions.

To increase data security, reduce communication cost, or both, a client device can perform one or more local differential privacy operations on data before transmission. This can include generating a vector encoding of one or more data items being transmitted and introducing noise to each bit of the vector, e.g., by randomly permuting bits of the vector according to a particular local differential privacy mechanism. The client device can transmit the output vector, e.g., an encrypted output vector, to the recipient processing system. The recipient processing system can decrypt the output vector and extract one or more values from the decrypted vector This specification describes techniques for encoding a collection of data items before transmission to the recipient processing system using a hybrid combination of encoding techniques. For example, the collection of data items can be encoded to an m-bit vector using both unary encoding and hash-based encoding techniques. The unary encoding is applied to a top mi number of items in the collection of data items according to some criteria, e.g., most accessed items. The remaining items are encoded using hash-based encoding. In some implementations, unary encoding is used for a subset of the data to be encoded to ensure high accuracy while using hybrid-based encoding for the remainder of the data to be encoded to reduce communication costs. The selection of the subset of the data can depend on particular characteristics of the data. Local differential privacy can then be applied to each bit according to one or more local differential privacy mechanisms before transmission to the recipient processing system.

In general, one innovative aspect of the subject matter described in this specification can be embodied in methods that include the actions of obtaining dataset for transmission; dividing the dataset into two subsets according to one or more selection criteria, wherein data items that satisfy the one or more criteria are added to a first subset and the data items that do not satisfy the one or more criteria are added to a second subset, wherein the first subset is smaller than the second subset; encoding the data items of the first subset according to a first encoding technique and encoding the data items of the second subset according to a second encoding technique; applying a local differential privacy (LDP) mechanism to data elements of the first subset and the second subset to generate an LDP message; and transmitting the LDP message to an external recipient. Other embodiments of this aspect include corresponding computer systems, apparatus, and computer programs recorded on one or more computer storage devices, each configured to perform the actions of the methods.

This specification uses the term "configured" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The subject matter described in this specification can be implemented in various implementations and may result in one or more of the following advantages. Different encoding techniques can carry with them different tradeoffs, e.g., between accuracy of the differentially private output and communication resource usage. For example, unary encoding provides high accuracy, but can also result in high communication costs particularly with large sets of data being encoded. On the other hand, hash-based encoding can reduce communication resource usage as it depends on hash domain size and not input domain size, but a smaller hash domain can result in hash collisions that reduce the accuracy of the local differential privacy. By using a hybrid combination of encoding techniques, the tradeoffs can be managed to balance the tradeoffs to achieve high accuracy and lower communication resource usage that results in an improvement over using either technique alone.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
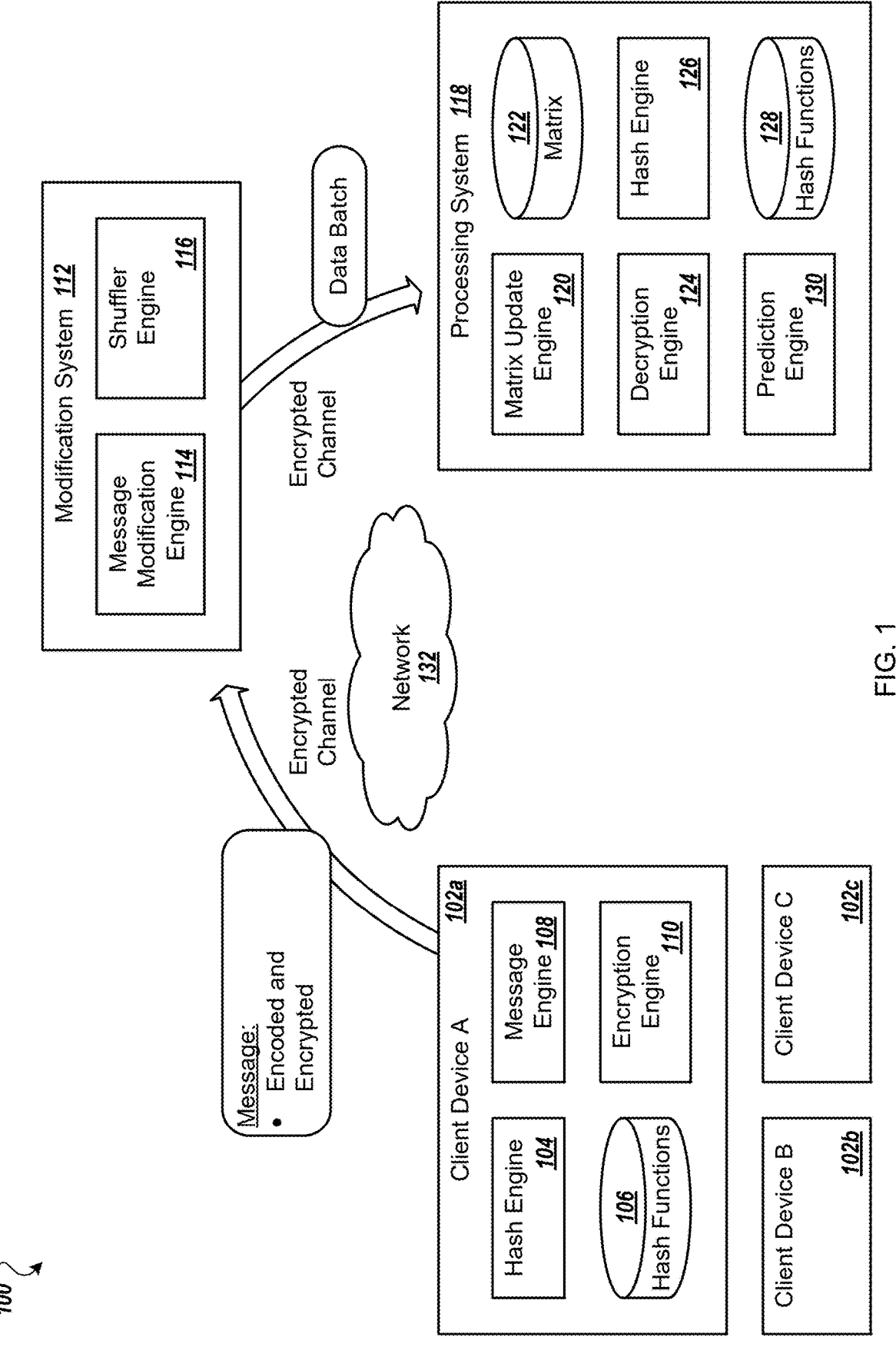
FIG. 1 depicts an example environment in which one or more client devices provide data to a processing system using local differential privacy.

FIG. 1 depicts an example environment 100 in which one or more client devices 102a-c provide data to a processing system 118 using local differential privacy. The client devices 102a-c can use one or more local differential privacy ("LDP") operations to increase security of data transmitted to the processing system 118, reduce a communication cost of the transmission, e.g., in network bandwidth or other computational resources, or a combination of both.

The client devices 102*a-c* can follow an LDP framework to mask some of the data for transmission to the processing system 118. The masking can cause the data to be anonymized before the data is transmitted by the respective client devices 102*a-c*. Compared to other systems in which the masking is performed by the processing system 118 or not performed at all, masking by the client devices 102*a-c* can increase data security and, as a result, data privacy by reducing a likelihood that a bad actor will be able to determine the specific data that is specific to a corresponding client device 102*a-c*.

The masking can include any appropriate operations on source data. For instance, the client devices 102*a-c* can generate noise data and combine the noise data with the source data. The client devices 102*a-c* can send the combined data to the processing system 118 for processing. Although the processing system 118 won't have only the source data, but will also have the noise data, the processing system 118 will still be able to process the combined data such that a utility of the results is substantially similar to a utility of processing results for the source data alone.

The client device A 102*a,* as an example of the client devices A-C 102*a-c*, includes a message engine 108. The message engine can generate a message by combining an output value, as an example of the source data, with one or more noise values. The output value can be any appropriate type of output, such as an output of an application executing on the client device A 102*a*.

An encryption engine 110 can encrypt the message for transmission to the processing system 118. The encryption engine 110 can use any appropriate process for encrypting the message. In some systems, the encryption engine 110 is optional, as messages can be sent after applying local differential privacy without further encryption.

The client device A 102*a* can transmit the encrypted message to the processing system 118. The processing system 118 receives the encrypted message. The processing system 118 can decrypt the encrypted message, e.g., using any appropriate process that corresponds to the encryption process.

The processing system 118 can use a prediction engine 130 to predict outputs given the data from the decrypted message. For instance, given a number of messages, e.g., included in a data batch, received from different ones of the client devices A-C 102*a-c*, all of which include at least some noise, the prediction engine 130 can make one or more inferences using the data batch. The processing system 118 can perform one or more actions using the one or more inferences.

In some implementations, the environment 100 includes a modification system 112. The environment 100 can use the modification system 112 to increase data security, privacy, or both. For instance, the client device A 102*a* can provide the encrypted message to the modification system 112.

The modification system 112 includes a message modification engine 114. The message modification engine 114 removes data from the received message, e.g., to increase data security, privacy, or both. For instance, the message modification engine 114 can generate a second encrypted message that includes the encrypted body of the previous message but without any data that is specific to the client device A 102*a* from which the encrypted message was received, e.g., without any device A specific data. In this way, the second encrypted message can be further anonymized compared to the anonymized encrypted message. The message modification engine 114 can remove any device identifiers or other types of data that could potentially be used to associate the encrypted body of the message with the source client device A 102*a*. In some examples, the message modification engine 114 removes a header from the encrypted message to generate the second encrypted message that only includes the encrypted data from the body of the encrypted message.

The modification system 112 can include a shuffler engine 116 that randomly shuffles the second encrypted messages. For example, the modification system 112 can receive n encrypted messages from various client devices 102*a-c*. The modification system 112 can receive more than one message from some of the client devices 102*a-c*. The modification system 112 can receive a single message or no messages from some of the client devices 102*a-c*.

The shuffler engine 116 can, e.g., randomly, change the order in which the second encrypted messages are included in a data batch. For instance, as the modification system 112 receives encrypted messages, the modification system 112 can add the encrypted messages to a data batch, e.g., with a maximum size n, in an order in which the encrypted messages are received. When the modification system 112 determines that a transmission criterion is satisfied, e.g., a time criterion or the data batch includes the maximum size n of encrypted messages, the shuffler engine 116 changes the order in which the encrypted messages are included in the data batch to a second order that is different from the received in order. For example, the shuffler engine 116 can randomly change the order of two or more messages in the data batch, e.g., using any appropriate random permutation operations such as entry-by-entry brute force or Fisher-Yates. In some alternative implementations, the shuffler engine can be optional.

In some examples, the modification system 112 can discard a message received from one of the client devices 102*a-c*. For instance, upon receiving a message from the client device A 102*a,* the modification system 112 can determine whether a number of messages received from the client device A 102*a* satisfies a message threshold, e.g., a maximum number of messages that can be received from any client device. If the threshold is not satisfied, the modification system 112 can process the message, e.g., using one or both of the message modification engine 114 or the shuffler engine 116.

If the threshold is satisfied, the modification system 112 can determine to skip processing the message. This can include deleting the data for the message from memory. By determining to skip processing the message, the modification system 112 can increase data security, e.g., reducing a likelihood that sensitive data for the client device A 102*a* might be inferred by the processing system 118. By determining to skip processing the message, the modification system 112 can reduce a likelihood of a data poisoning attack affecting any analysis by the processing system 118, e.g., destroying the aggregation in the data batch.

The processing system 118 can receive the data batch from the modification system 112. The processing system 118 can process the encrypted messages included in the data batch, e.g., as described above.

In some implementations, after decrypting the encrypted messages, e.g., from the data batch and using the decryption engine 124, a matrix update engine 120 included in the processing system 118 can update a matrix 122 using data from the decrypted message. For instance, the decrypted message, e.g., the combined data generated by the client device A 102*a,* can identify one or more locations in the matrix 122 that should be updated. The matrix 122 can include one entry for each of a fixed number of values generated by the client devices 102a-c, whether the values are the original output values or noise values. The values can represent any appropriate type of data, such as data generated by an application executing on the respective client device 102a-c, e.g., a social media application. In some examples, the values can represent a search string, a uniform resource identifier ("URI"), a website, a news article, or other appropriate types of data for an application on the client device 102a-c. For example, each location in the matrix 122 can indicate a number of times that the corresponding location was identified in a decrypted message. When the matrix 122 has one hundred locations, the fifteenth location can indicate a number of times that location was identified in a decrypted message. For instance, when a value at the fifteenth location is sixty-five, that indicates that sixty-five decrypted messages from any combination of client devices 102a-c identified the fifteenth location.

In some implementations, as part of generating a message, the message engine 108 generates a vector encoding using a hybrid technique. The hybrid message can be a vector in which a set of data items are encoded using two or more encoding techniques. The hybrid message can then have noise added according to one or more local differential privacy mechanisms for transmission to the processing system 118.

Figure 2:
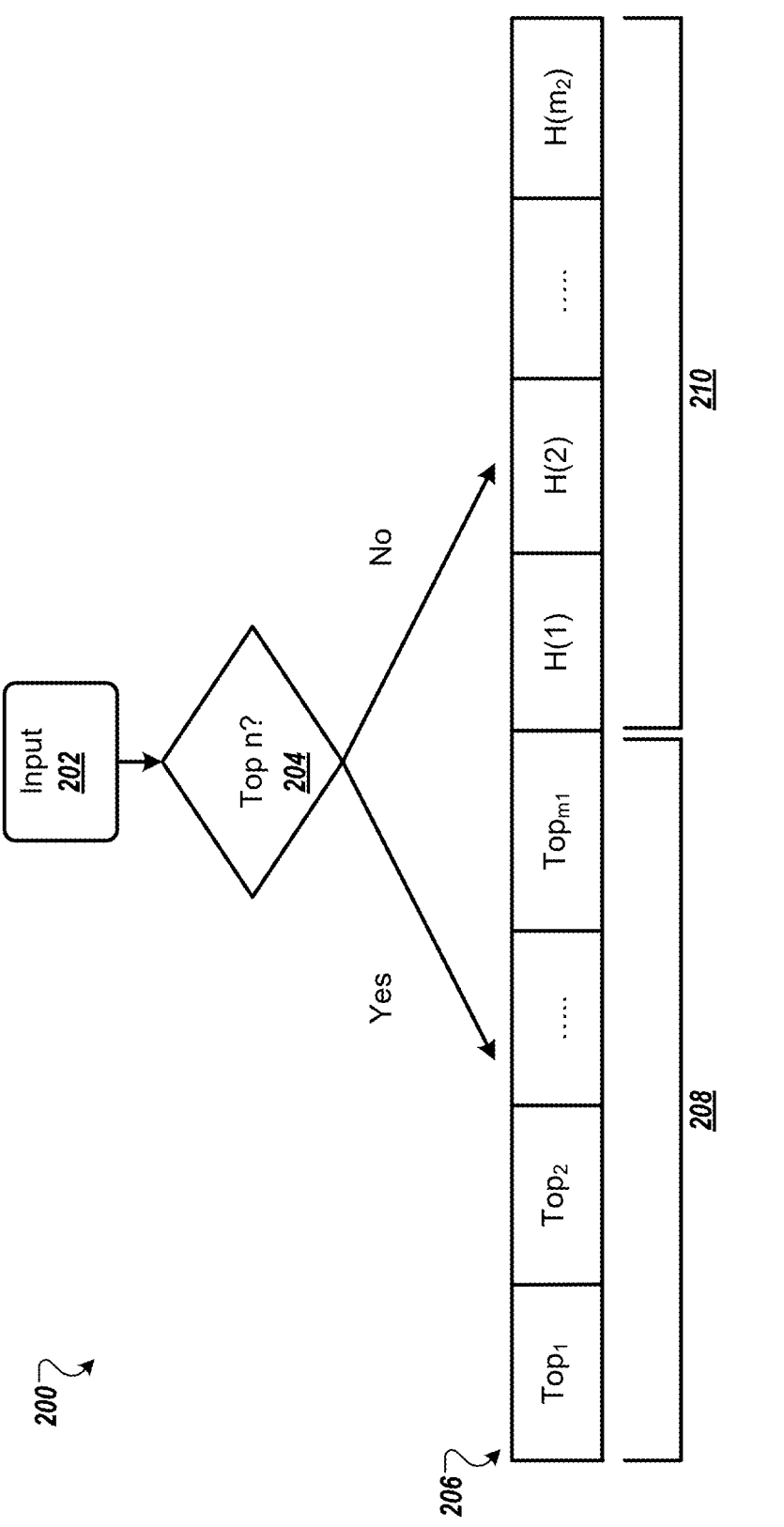
FIG. 2 is a block diagram of an example hybrid encoding.

FIG. 2 is a block diagram 200 of an example hybrid encoding. For an input dataset 202 having a collection of data items, a first encoding is applied to a subset of the data items and a second encoding is applied to the remaining data items of the dataset. To determine the subset, a particular decision criteria is used. In the example shown in FIG. 2, the criteria is whether the data point is a top n data item 204 of the dataset. Top n can be based on various criteria, for example, top n most accessed data items from the dataset. Other criteria can be used. Different criteria can be used depending on the particular use case. For example, if the use case is to collect URLs, but distinguishing between URL's owned by the server and all others, the "top n" criteria can instead be "server owned" vs. the rest. The server owned URLs can then be encoded using the first encoding and the rest encoded using the second encoding. In another example, the criteria can be frequency of emoji's used, the set for using the first encoding can be based on "newness" of a first set of emoji's vs. the rest.

Based on the determination 204 of whether each data item satisfies the criteria, the data items are encoded into a vector using either the first encoding or the second encoding. As shown in FIG. 2, vector 206 includes first region 208 and second region 210. The top n data items can be encoded in the first region 208 according to the unary encoding. This means that the top n data items will be encoded with the greatest accuracy.

The unary encoding encodes the top n data items into a corresponding number of vector entries. In more detail, the data items can be part of a domain of values indicating, for example, the range of values representing the data items. For example, if each data item is an integer from 1 to 10, then the size of the domain is 10. The vector for encoding the data items has a length $m_1$ equal to the domain size. Thus, the vector for encoding the data items would have a length of 10. The vector can initially be set with each element as a binary zero. For a first data item x having a value of 5, the fifth element of the vector will be assigned a binary 1 while all other elements of the vector will remain zero.

The top n data items have values within the range of $m_1$. If the data items have alphanumeric values, they can first be converted into a numerical value. The top n data items are then encoded into $m_1$ elements of the vector corresponding to the domain of the values of the top n data items.

The remaining data items are encoded in the second region 210 according to one or more hash-based encoding techniques. The hash-based technique can map the input domain (the data items in the remainder of the data set) to a smaller domain $m_2$. For instance, the hash engine 104 can map the data item values to an output value in the finite domain M. The output value can be an integer that is limited by the domain M, e.g., in $\{1, \ldots, m2\}$. Here, $m_2$ can denote the hashing range and M can represent the hashing domain. Then, similar to the unary encoding above, the x-th hash value is encoded in the x-th element of $m_2$, e.g., $m_1+X$.

Consequently, the overall communication cost of the hybrid encoding is $m=m_1+m_2$, which is less than the size of the dataset.

To provide a specific example for clarity, the input dataset could be a set of uniform resource locator (URL) addresses corresponding, for example, to specific web pages. Some web pages are visited more frequently. It may be desired to have the greatest accuracy for those most frequently visited web pages. Thus, the top n criteria can be to identify $m_1$ most frequently accessed web pages from the dataset. The corresponding URLs can then be encoded into the vector with unary encoding. For the rest of the web pages, the hash-based technique is used to map them to $m_2$ entries in the vector. In one example, when the domain of mi is small, e.g., 10, a mapping table could be used to map the top n data items, e.g., URLs, to a result number. Then to compute the encoding, the lookup table is used to identify the coding position relative to the data item.

The resulting data analysis may not be as accurate for the web pages encoded in $m_2$ due to potential hash collisions. Hash collisions may exist because the hash values have a smaller domain than the data items. As a result, more than one data item may have the same hash value. However, the communication resources needed to send the vector can be greatly reduced. For example, the top n may be limited to 100 most visited URLs from a dataset having 10,000 URLs. After encoding 100 URLs using the unary encoding, the remaining 9,900 URLs in the dataset may be mapped to a smaller domain having only $m_2=100$ entries. Thus, the communication cost has been reduced from 10,000 to 200.

Figure 3:
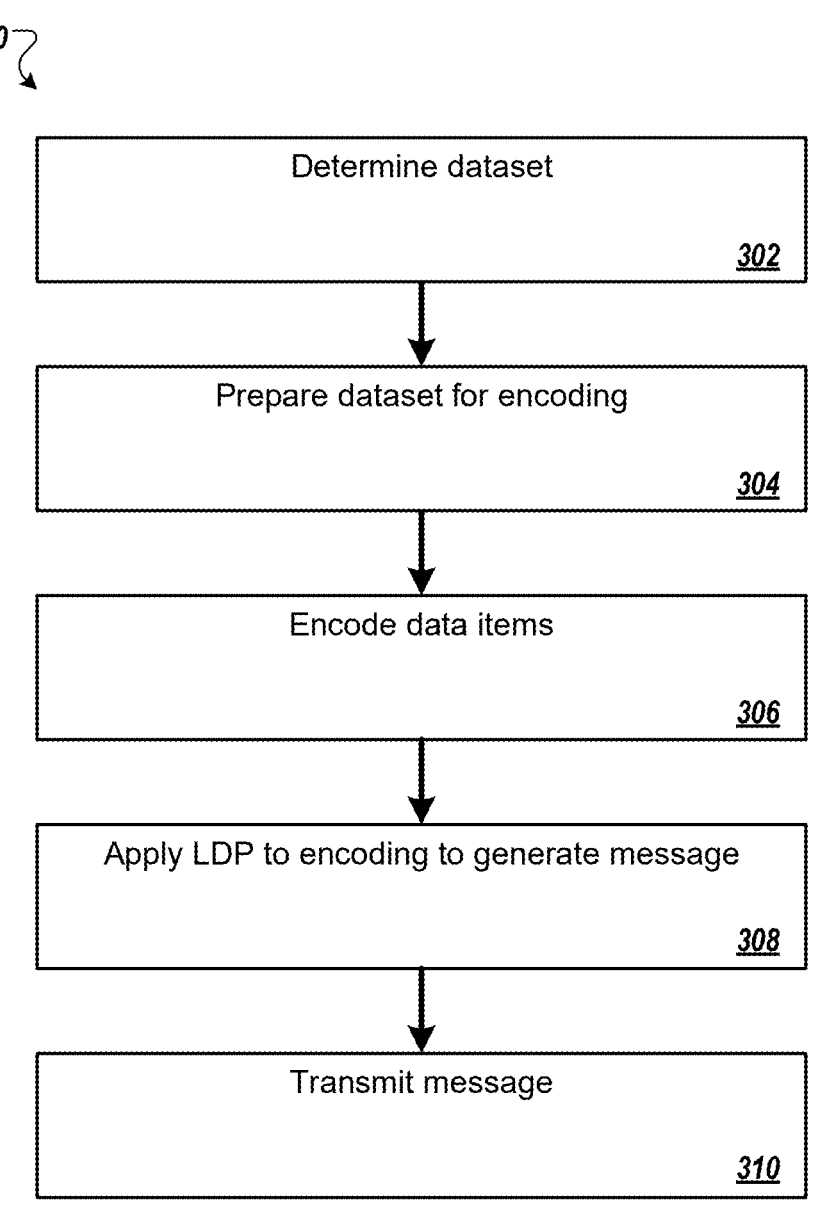
FIG. 3 is a flow diagram of an example process for hybrid encoding.

FIG. 3 is a flow diagram of an example process 300 for generating a hybrid encoding for a dataset. For convenience, the process 300 will be described with respect to a client device including, for example, a message engine, that carries out the process 300. For example, the process 300 can be used by one of the client devices A-C 102a-c, from the environment 100.

The client device determines a dataset for transmission to a processing system (202). The dataset can be determined, for example, in response to a request from a remote processing system or based on predefined instructions or routines for message transmission.

The client device prepares the dataset for encoding (204). The dataset has a particular domain representing the number of data items in the dataset. The preparation includes applying one or more criteria to split the data set into two subsets, the first subset corresponding to data items that satisfy the one or more criteria and the second subset corresponding to data items that do not satisfy the one or more criteria. For example, the one or more criteria can be based on a top n evaluation that takes a predefined top number of data items that satisfy the criteria. Typically, the one or more criteria are defined such that the number of data items in the first subset is small relative to the size of the domain. The preparation further includes selecting a hash function for applying hash-based encoding to the second subset. For example, a hash function $H(x)=y$ where $x \in$ second subset and $y \in m_2$, which corresponds to the hashing range for items in the second subset. The data preparation can also include converting alphanumeric data values into numerical values.

The client device encodes the data items of the dataset (206). A vector is initialized. The vector has length $m=m_1+m_2$. Each entry is initially set to zero. The first $m_1$ bits of the vector are used to store the encoding for the data items of the first subset and the last $m_2$ bits of the vector are used to store the encoding for the data items of the second subset. Specifically, the first $m_1$ bits are used to store unary encoding values for the data items of the first subset and the second $m_2$ bits are used to store hash results of the data items of the second subset.

For example, for a set of data items, if the data item having value x is in the first subset, then the x-th element of the vector is set to bit value 1. Similarly, if the data item having value $h(x)$ is in the second subset, then the element in the vector with index $m_1+h(x)$ is set to bit value 1.

The client device applies one or more LDP mechanisms to the encoded data items to generate an LDP message (208). Local differential privacy mechanisms are used by local devices to reduce the probability of determining the true individualized data values while still allowing a remote system, which may be aggregating data received from multiple local devices, to perform statistical analyses with an acceptable degree of accuracy. Local differential privacy typically includes the addition of some random noise to data output before transmission.

In some implementations, the client device determines or retrieves differential privacy parameters and budget. The client device uses the privacy budget and parameters with a local differential privacy mechanism for unary encodings. The first local differential privacy mechanism can include randomly perturbing one or more of the first $m_1$ bits of the vector. In other words, some bits with value 1 are flipped to value 2 and some bits with value zero are flipped to value 1. The client device uses the privacy budget and parameters with a second local differential privacy mechanism for hash-based encoding. The second local differential privacy mechanism can include randomly perturbing one or more of the first $m_2$ bits of the vector.

The client device transmits the LDP message to the processing system (210). In some implementations, the LDP message can be encrypted, e.g., by encryption engine 110, prior to transmission. In some implementations, communications between the client devices 102a-c and the processing system 118 can use one or more encrypted channels. For instance, the communications can use a network 132 through which the messages, e.g., encrypted messages, are passed. The client devices 102a-c can each create a corresponding encrypted channel with the processing system 118, or the modification system 112 for implementations that include the modification system 112. The client devices 102a-c can then use the encrypted channels to transmit the messages to a corresponding destination, e.g., the modification system 112 or the processing system 118.

Some systems generate the combined data that includes both the output value and one or more noise values using unary encoding. In these systems, when the matrix 122 has m locations, and the values can be binary values that indicate whether the corresponding location is true, e.g., the corresponding URI was accessed or search string was used. In some implementations, the message engine 108 can further determine whether to include the output value in a message for the processing system 118. This can increase data security for the source data since the message might not always have a value for the actual source data. For instance, the message engine 108 can determine with a probability of 0.5 whether to include the output value in the message.

While a vector data structure has been described above for the message, the message can include any appropriate type of data structure that includes separate portions for different types of encoding. The message size s can be any appropriate value, determined by any appropriate device or system, or a combination of these. In some implementations, the client device A 102a selects the message size s. In these implementations, the client device A 102a provides the message size to the processing system 118, e.g., as part of the message, or the processing system 118 can determine the message size s using data for the message, e.g., a number of entries in the message body. In some implementations, the processing system 118 determines the message size s and provides data that indicates the message size s to a respective client device 102a. At least some of the client devices 102a-c can have the same message size s. At least some of the client devices 102a-c can have different message sizes s.

The message size s can be determined using any appropriate process. For instance, the message size can be computed using a differential privacy parameter ¿ or based on the hashing range. When the environment 100 uses different message sizes s for different devices 102a-c, the different message sizes s can be based on different hashing ranges m, different differential privacy parameters E, or a combination of both.

The processing system 118 and the modification system 112 are each an example of a system implemented as computer programs on one or more computers in one or more locations, in which the systems, components, and techniques described in this specification are implemented. The client devices A-C 102a-c can include personal computers, mobile communication devices, and other devices that can send and receive data over the network 132. The network 132, such as a local area network ("LAN"), wide area network ("WAN"), the Internet, or a combination thereof, connects the client devices A-C 102a-c, the modification system 112, and the processing system 118. The network 132 can be used to implement one or more encryption channels through which messages are communicated. The processing system 118, the modification system 112, or a combination of both, can use a single computer or multiple computers operating in conjunction with one another, including, for example, a set of remote computers deployed as a cloud computing service.

The processing system 118, the modification system 112, or both, can each include several different functional components, including the message modification engine 114, the shuffler engine 116, the matrix update engine 120, the decryption engine 124, the hash engine 126, and the prediction engine 130. The message modification engine 114, the shuffler engine 116, the matrix update engine 120, the decryption engine 124, the hash engine 126, the prediction engine 130, or a combination of these, can include one or more data processing apparatuses, can be implemented in code, or a combination of both. For instance, each of the message modification engine 114, the shuffler engine 116, the matrix update engine 120, the decryption engine 124, the hash engine 126, and the prediction engine 130 can include one or more data processors and instructions that cause the one or more data processors to perform the operations discussed herein.

The various functional components of the processing system 118, the modification system 112, or both, can be installed on one or more computers as separate functional components or as different modules of a same functional component. For example, the components of the processing system 118, the modification system 112, or both, can be implemented as computer programs installed on one or more computers in one or more locations that are coupled to each through a network. In cloud-based systems for example, these components can be implemented by individual computing nodes of a distributed computing system.

In some implementations, the device might execute a social media application, e.g., a native application or by accessing a web site. The device and the processing system can collaborate on data processing when the device provides data to the processing system. By using one or more processes described in this specification, the device can provide data, e.g., data records, to the processing system without sharing particular user data that is associated with a corresponding user.

For situations in which the systems discussed here collect personal information about people, or may make use of personal information, the people may be provided with an opportunity to control whether programs or features collect personal information, or to control whether and/or how the system operates. In addition, as described above, data is anonymized in one or more ways before it is stored or used, so that personally identifiable information is removed. For example, the message modification engine can remove any device or other identification data from messages received from the client devices A-C. The shuffler engine can randomly permute an order in which messages are included in a data batch to reduce a likelihood of personally identifiable information being inferred from the data batch.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" is used broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Figure 4:
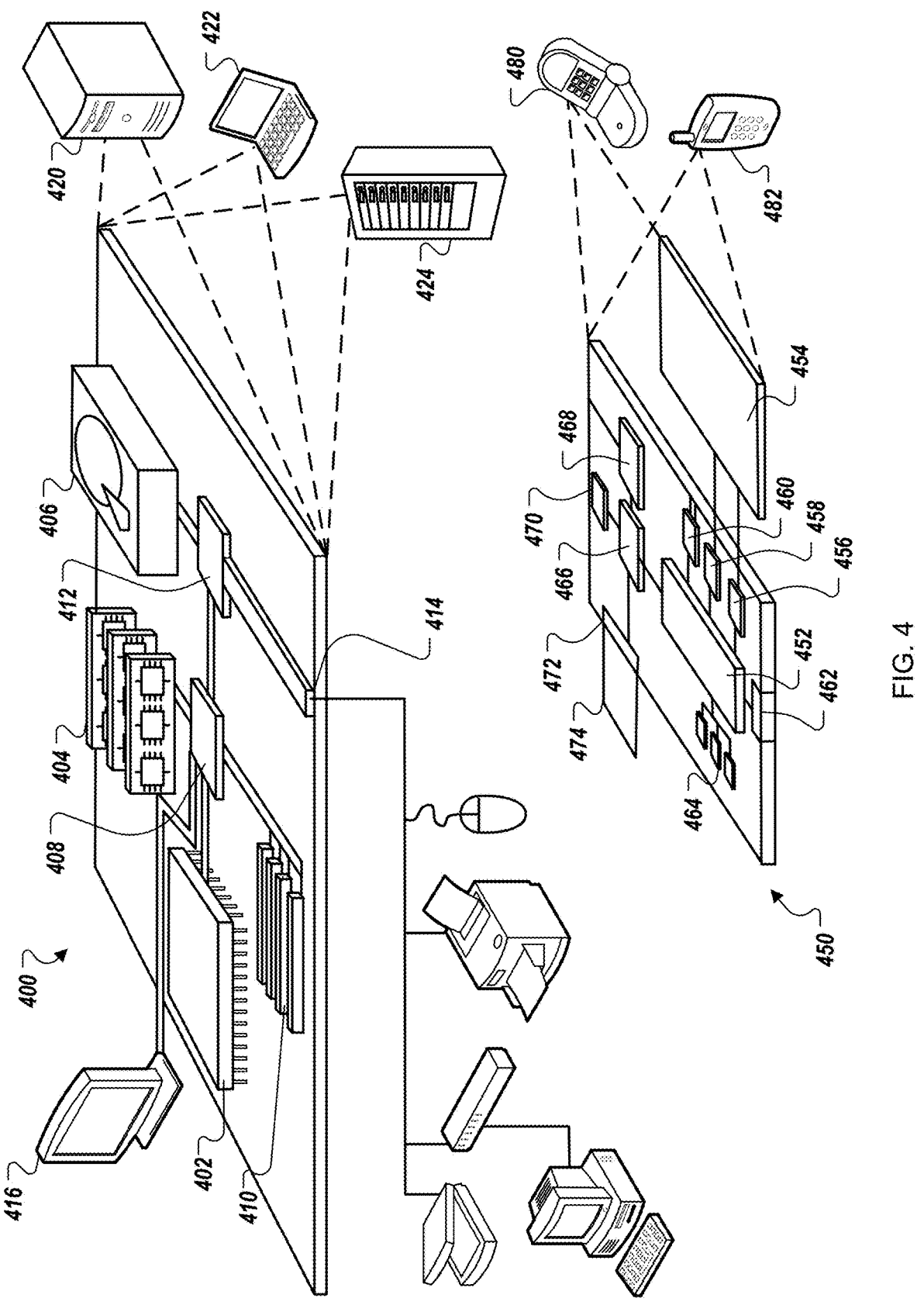
FIG. 4 is a block diagram of computing devices that may be used to implement the systems and methods described in this specification.

FIG. 4 is a block diagram of computing devices 400, 450 that may be used to implement the systems and methods described in this specification, as either a client or as a server system or plurality of server systems. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smart-watches, head-worn devices, and other similar computing devices. The components shown here, their connections and relationships, and their functions, are meant to be exemplary only, and are not meant to limit implementations described and/or claimed in this specification.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer-or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer-or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

In addition to the embodiments of the attached claims and the embodiments described above, the following numbered embodiments are also innovative.

Embodiment 1 is a method comprising obtaining dataset for transmission; dividing the dataset into two subsets according to one or more selection criteria, wherein data items that satisfy the one or more criteria are added to a first subset and the data items that do not satisfy the one or more criteria are added to a second subset, wherein the first subset is smaller than the second subset; encoding the data items of the first subset according to a first encoding technique and encoding the data items of the second subset according to a second encoding technique; applying a local differential privacy (LDP) mechanism to data elements of the first subset and the second subset to generate an LDP message; and transmitting the LDP message to an external recipient.

Embodiment 2 is the method of embodiment 1, wherein the first encoding is unary encoding and the second encoding is hash-based encoding.

Embodiment 3 is the method of any one of embodiments 1 through 2, wherein the data items are encoded in a vector having a first portion used to encode values of data items in the first subset and a second portion used to encode hashed data item values from the second subset.

Embodiment 4 is the method of any one of embodiments 1 through 3, wherein the hash-based encoding domain is less than the domain of the values of the data items in the second subset.

Embodiment 5 is the method of any one of embodiments 1 through 4, wherein a same LDP mechanism is applied to the first encoding and the second encoding.

Embodiment 6 is the method of any one of embodiments 1 through 5, wherein the LDP mechanism flips one or more bits of an encoding vector to add noise to the LDP message sent to the external recipient.

Embodiment 7 is the method of any one of embodiments 1 through 6, wherein the dataset is divided according to top n values of data items according to the one or more criteria.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer program carrier encoded with a computer program, the program comprising instructions that are operable, when executed by one or more computers, to cause the one or more computers to perform the method of any one of embodiments 1 to 7.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

The invention claimed is:

1. A method comprising:

obtaining dataset for transmission;

dividing the dataset into two subsets according to one or more selection criteria, wherein data items that satisfy the one or more selection criteria are added to a first subset and the data items that do not satisfy the one or more selection criteria are added to a second subset, wherein the first subset is smaller than the second subset;

encoding the data items of the first subset according to a first encoding technique and encoding the data items of the second subset according to a second encoding technique, wherein the first encoding technique is unary encoding and the second encoding technique is hash-based encoding;

applying a local differential privacy (LDP) mechanism to data elements of the first subset and the second subset to generate an LDP message; and transmitting the LDP message to an external recipient.

2. The method of claim 1, wherein the data items are encoded in a vector having a first portion used to encode values of data items in the first subset and a second portion used to encode hashed data item values from the second subset.

3. The method of claim 1, wherein a hash-based encoding domain is less than a domain of values of the data items in the second subset.

4. The method of claim 1, wherein a same LDP mechanism is applied to the first encoding technique and the second encoding technique.

5. The method of claim 1, wherein the LDP mechanism flips one or more bits of an encoding vector to add noise to the LDP message sent to the external recipient.

6. The method of claim 1, wherein the dataset is divided according to top n values of data items according to the one or more selection criteria.

7. A system comprising:

one or more computers and one or more storage devices on which are stored instructions that are operable, when executed by the one or more computers, to cause the one or more computers to perform operations comprising:

obtaining dataset for transmission;

dividing the dataset into two subsets according to one or more selection criteria, wherein data items that satisfy the one or more selection criteria are added to a first subset and the data items that do not satisfy the one or more selection criteria are added to a second subset, wherein the first subset is smaller than the second subset;

encoding the data items of the first subset according to a first encoding technique and encoding the data items of the second subset according to a second encoding technique, wherein the first encoding technique is unary encoding and the second encoding technique is hash-based encoding;

applying a local differential privacy (LDP) mechanism to data elements of the first subset and the second subset to generate an LDP message; and transmitting the LDP message to an external recipient.

8. The system of claim 7, wherein the data items are encoded in a vector having a first portion used to encode values of data items in the first subset and a second portion used to encode hashed data item values from the second subset.

9. The system of claim 8, wherein a hash-based encoding domain is less than a domain of values of the data items in the second subset.

10. The system of claim 7, wherein a same LDP mechanism is applied to the first encoding technique and the second encoding technique.

11. The system of claim 7, wherein the LDP mechanism flips one or more bits of an encoding vector to add noise to the LDP message sent to the external recipient.

12. The system of claim 7, wherein the dataset is divided according to top n values of data items according to the one or more selection criteria.

13. One or more non-transitory computer storage media encoded with computer program instructions that when executed by one or more computers cause the one or more computers to perform operations comprising:

obtaining dataset for transmission;

dividing the dataset into two subsets according to one or more selection criteria, wherein data items that satisfy the one or more selection criteria are added to a first subset and the data items that do not satisfy the one or more selection criteria are added to a second subset, wherein the first subset is smaller than the second subset;

encoding the data items of the first subset according to a first encoding technique and encoding the data items of the second subset according to a second encoding technique, wherein the first encoding technique is unary encoding and the second encoding technique is hash-based encoding;

applying a local differential privacy (LDP) mechanism to data elements of the first subset and the second subset to generate an LDP message; and transmitting the LDP message to an external recipient.

14. The one or more non-transitory computer storage media of claim 13, wherein the data items are encoded in a vector having a first portion used to encode values of data items in the first subset and a second portion used to encode hashed data item values from the second subset.

15. The one or more non-transitory computer storage media of claim 13, wherein a hash-based encoding domain is less than a domain of values of the data items in the second subset.

16. The one or more non-transitory computer storage media of claim 13, wherein a same LDP mechanism is applied to the first encoding technique and the second encoding technique.

17. The one or more non-transitory computer storage media of claim 13, wherein the dataset is divided according to top n values of data items according to the one or more selection criteria.

* * * * *